United States Patent [19]
Schuller et al.

[11] 3,830,552
[45] Aug. 20, 1974

[54] JOURNAL BEARINGS

[75] Inventors: Fredrick T. Schuller; Warren A. Moore, both of Cleveland, Ohio

[73] Assignee: The United States of America as represented by the Administrator of the National Aeronautics and Space Administration, Washington, D.C.

[22] Filed: Mar. 30, 1973

[21] Appl. No.: 346,483

Related U.S. Application Data

[62] Division of Ser. No. 238,264, March 27, 1972.

[52] U.S. Cl. ............................................. 308/121
[51] Int. Cl. ........................................... F16c 19/04
[58] Field of Search .............................. 308/121, 73

[56] References Cited
UNITED STATES PATENTS

| | | | |
|---|---|---|---|
| 2,322,004 | 6/1943 | Fost | 308/73 |
| 2,424,028 | 7/1947 | Hoeberlein | 308/73 |

*Primary Examiner*—Charles J. Myhre
*Assistant Examiner*—Frank Susko
*Attorney, Agent, or Firm*—N. T. Musial; G. E. Shook; J. R. Manning

[57] ABSTRACT

A plurality of bearing sectors are mounted in a housing. Each sector functions as a lobed area in the bearing to obtain the required lubricant film geometry.

1 Claim, 8 Drawing Figures

JOURNAL BEARINGS

RELATED APPLICATION

This application is a division of application Ser. No. 238,264 which was filed Mar. 27, 1972.

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention is concerned with the instability of zero or lightly loaded shafts when they rotate at high speeds in bearings in low viscosity lubricants. This instability refers to a self-excited fractional-frequency whirl or tendency of the shaft center to orbit the bearing center at an angular velocity about half that of the shaft around its own center.

This tendency of lightly loaded rotors running at high speeds to orbit or whirl about the bearing center is caused by a film force component, acting at right angles to the line of centers of the journal and bearing, which predominates under light or zero load conditions. This self-excited instability produces an outward spiraling of the rotor in the direction of shaft rotation when the speed is increased. Destructive seizure may result if the rotor contacts the bearing.

The successful operation of a power generation system for space vehicles employing liquid metals as the working fluid depends upon the ability of a journal bearing to inhibit this instability. Tilting pad bearings have been proposed for such applications because these bearings are exceptionally stable. However, tilting pad bearings are complex in that they contain several parts and may be subject to pivot surface damage.

SUMMARY OF THE INVENTION

These problems have been overcome by utilizing bearings constructed in accordance with the present invention. Each bearing is of fixed geometry and utilizes a plurality of sectors to provide lobed areas which function as a pump when the rotor turns. The resulting pressure distribution is similar to that obtained in a hydrostatic gas bearing.

The geometry of the lubricant film depends on the configuration of the sectors. The film geometry may be converging, diverging, or a combination thereof.

It is, therefore, an object of the present invention to provide an improved journal bearing which may be constructed without expensive and complicated machining procedures.

A further object of the invention is to provide an improved journal bearing having removable lobed sectors which are easily replaced in case of damage.

Another object of the invention is to provide an inexpensive bearing having improved stability and simplified damping.

These and other objects of the invention will be apparent from the specification which follows and from the drawings wherein like numerals are used throughout to identify like parts.

DESCRIPTION OF THE DRAWINGS

Referring now to the drawings.

DESCRIPTION OF THE PREFERRED EMBODIMENT

Figure 1:
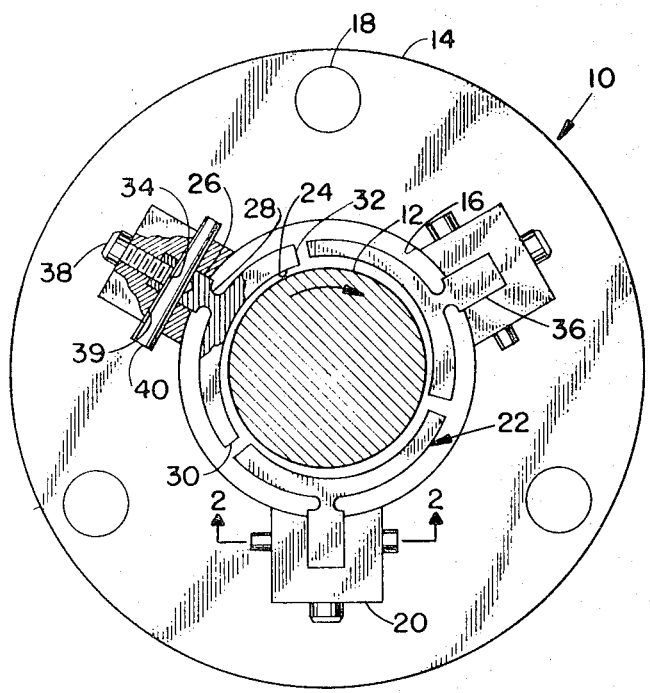
FIG. 1 is a plan view with parts in section of a bearing constructed in accordance with the present invention.

Referring now to the drawings, there is shown in FIG. 1 a bearing 10 constructed in accordance with the present invention which produces a converging-diverging film geometry. A lightly loaded shaft 12 rotates at high speed in the bearing 10 in a clockwise direction as indicated by the arrow. This shaft may operate stably at speeds as high as 9,000 rpm under a very light or zero load in low viscosity fluids such as water.

The bearing 10 comprises a housing in the form of a circular plate 14 having a bore 16 extending along the bearing axis for receiving the shaft 12. Suitable holes 18 are provided in the plate 14 for rigidly mounting the bearing and maintaining it in a stationary position as the shaft 12 rotates.

Figure 2:
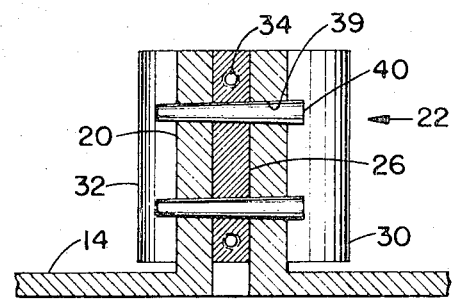
FIG. 2 is a section view taken along the line FIG. 2—2 in FIG. 1.

A plurality of rigid posts 20 extend outward from the plate 14 along the shaft 12 as shown in FIGS. 1 and 2. These posts are equally spaced about the bore 16.

According to the present invention a plurality of sectors 22 are mounted on the posts 20 as shown in FIGS. 1 and 2. Each sector 22 comprises a pad 24 flexibly mounted to a base 26 with a neck 28 having reduced thickness. In this manner the neck 28 forms a pivot for the pad 24 between its leading edge 30 and trailing edge 32.

The minimum radial clearance between the pad 24 and the shaft 12 is at the neck 28. Both the neck and the minimum radial clearance are located at a point approximately sixty percent of the sector arc length measured from the leading edge 30 of each sector.

All of the sectors 22 for each bearing 10 are preferably fabricated from a common cylinder of bearing material. The inside of this cylinder is rough bored to an inside diameter which approximates the outside diameter of the shaft 12. A plurality of holes 34 are drilled and tapped at the location of each mounting base 26.

The outside surface of the cylinder is machined to the contour of the attached sectors 22. The neck 28 of each sector 22 is machined to the desired thickness. This thickness is dependent upon the amount of flexibility desired. The cylinder is then cut into the desired number of pieces to make the sectors 22 for the bearing 10.

The base portion 26 of one sector 22 is inserted into a slot 36 in a post 20. Mounting screws 38 extend through the post 20 and are tightened into the threaded holes 34. Taper pin holes 39 are machined, after assembly, through the post 20 and base portion 26. Taper pins 40 are then inserted through the post 20 and the base 26 to rigidly secure the sector 22 in the bearing 10.

The surface of the pad 24 is then ground to a radius greater than that of the shaft 12 with its center offset a predetermined amount in a direction away from the neck 28 of the sector 22. Minimum radial clearance at the neck 28 is achieved by maintaining the axis of the grinding wheel on a line passing through the center of the bearing 10 and the base 26. After each sector 22 has been individually finish ground all the sectors are rigidly mounted in the bearing housing.

DESCRIPTION OF ALTERNATE EMBODIMENTS

Figure 3:
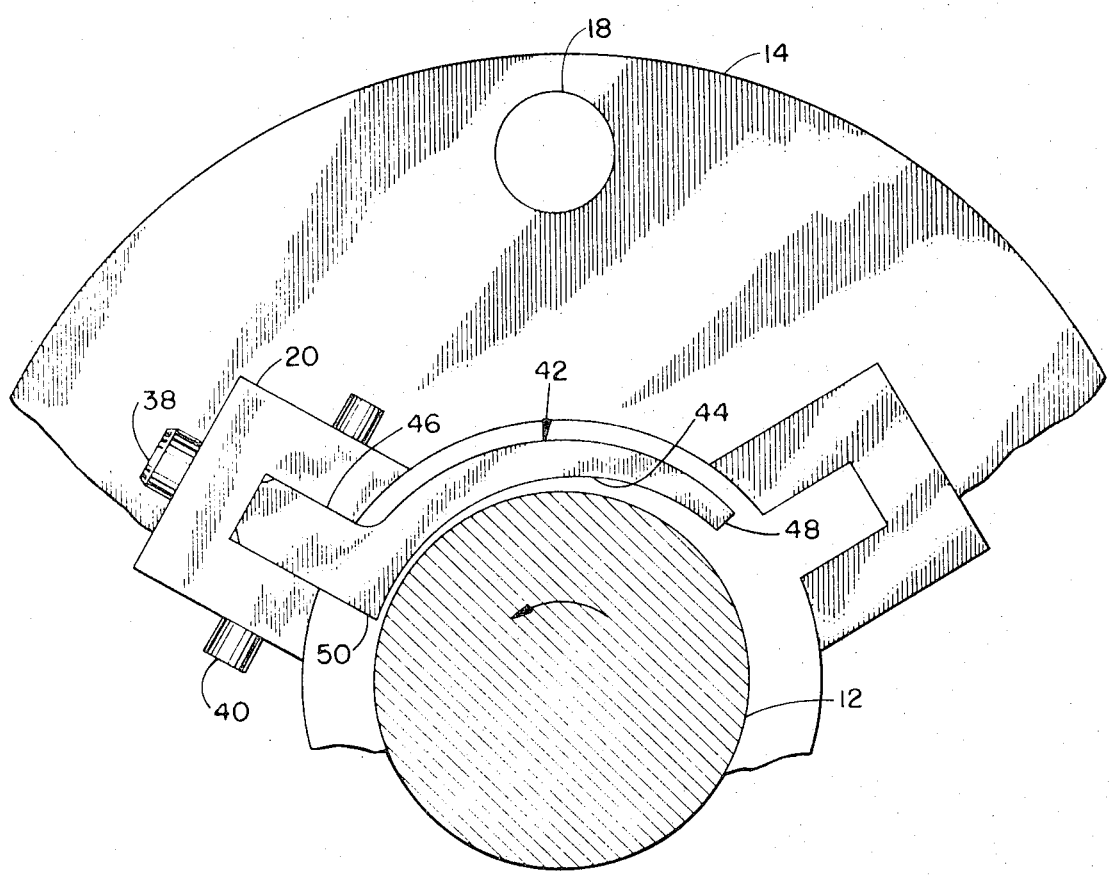
FIG. 3 is an alternate embodiment of the bearing shown in FIG. 1.

Referring now to FIG. 3 there is shown an alternate embodiment of the invention which is used to produce a wholly converging film geometry. This embodiment utilizes a bearing sector 42 comprising a pad 44 rigidly mounted on a base 46. The sectors 42 are produced in a manner similar to that used to machine the sectors 22 shown in FIGS. 1 and 2.

The sectors 42 are mounted in the posts 20 in the same manner as the sectors 22. The base 46 is formed on the extreme end of the sector 42. No neck of reduced thickness is used in this embodiment. The amount of sector flexibility is dependent on the wall thickness of the sector 42. The rigid portion of the sector 42 is located at the trailing edge 50 of the sector. The minimum radial clearance is at the approximate trailing edge 50 which is the most rigid portion of the sector 42. The maximum radial clearance is at the leading edge 48 which is the most flexible portion of the sector 42.

Figure 4:
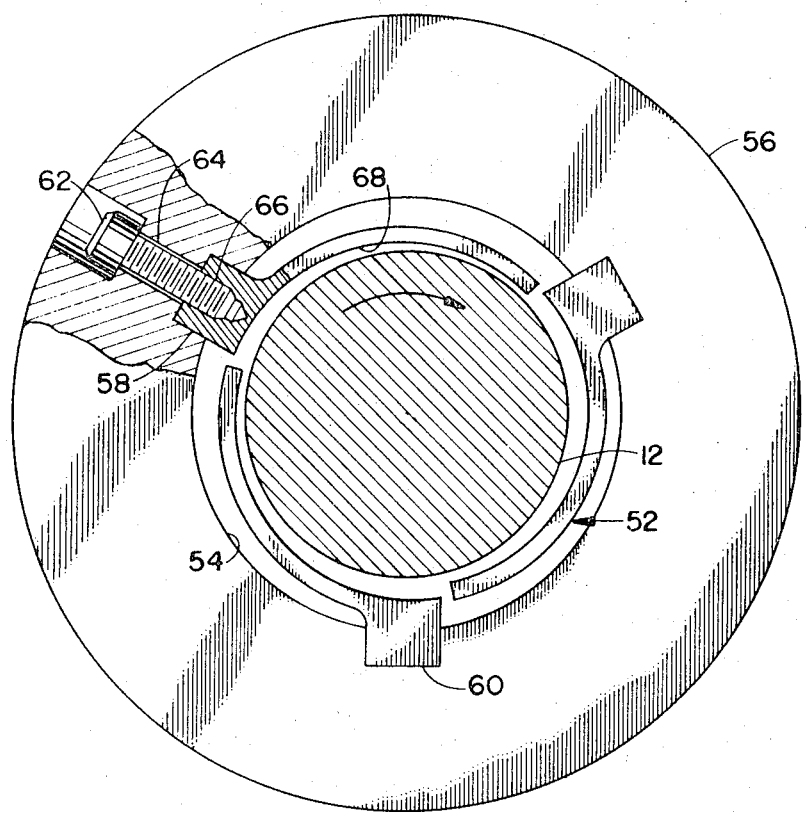
FIG. 4 is an alternate embodiment of the bearing shown in FIG. 3.

The bearing shown in FIG. 4 is similar to the one shown in FIG. 3 with the exception that the shaft 12 rotates in the opposite direction. In this manner the most rigid part of the sector is at the leading edge and the most flexible portion is at the trailing edge.

Figure 5:
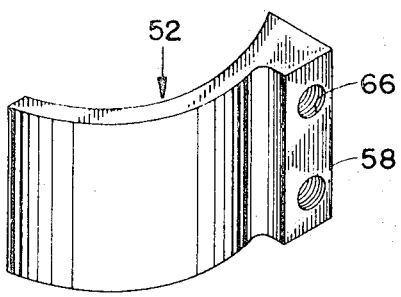
FIG. 5 is a perspective view of a sector of the bearing shown in FIG. 4.

In this embodiment a plurality of sectors 52 are mounted in a bore 54 of a cylindrical bearing housing 56. One of the sectors 52 is shown in greater detail in FIG. 5.

Each sector 52 has a rigid base 58 as shown in FIGS. 4 to 7 inclusive. The base 58 is mounted in a suitable slot 60 in the housing 56 as shown in FIG. 4. Each sector 52 is held in place in its slot 60 by a pair of screws 62 which extend through holes 64 in the housing 56. The screws 62 are received in tapped holes 66 in each base 58. When the screws 62 are tightened the base 58 of each sector 52 is rigidly mounted in the slot 60.

In this embodiment a pad 68 extends from the base 58 in the direction of rotation of the shaft 12. Each sector 52 has a thin wall and forms a cantilevered spring which converges in the direction of shaft rotation towards the shaft 12. The minimum radial clearance is at the trailing edge of each pad 68. The pads 68 form a wholly converging film geometry.

Figure 6:
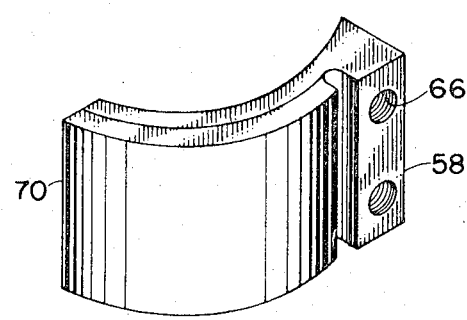
FIG. 6 is an alternate embodiment of the sector shown in FIG. 5.

Referring to the embodiment shown in FIG. 6 the spring action of the cantilevered pad 68 is damped. This is achieved by bonding a layer 70 of suitable damping material to the back surface of each sector 52. A layer of rubber has been satisfactory for this purpose.

Figure 7:
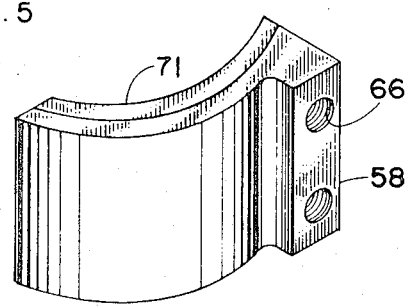
FIG. 7 is another alternate embodiment of the sector shown in FIG. 5.

A temperature compensating bearing is shown in FIG. 7. In this embodiment the sector 52 is a bimetal. One metal layer 71 is bonded to the sector 52. As the ambient temperature changes, the bi-metallic sector moves away from or towards the shaft 12 depending on the coefficient of expansion of the two bonded metals.

The inside radius of each bearing sector 52 is rough machined before assembly. The sectors 52 are then assembled individually in the bearing housing 56. The sectors are finish ground individually on the inside diameter by off-setting the center of the bearing housing 56 with that of the grinding wheel a predetermined amount that will result in a particular internal bearing geometry desired. After all the sectors 52 have been individually ground these sectors are assembled into the axial slots 60.

Figure 8:
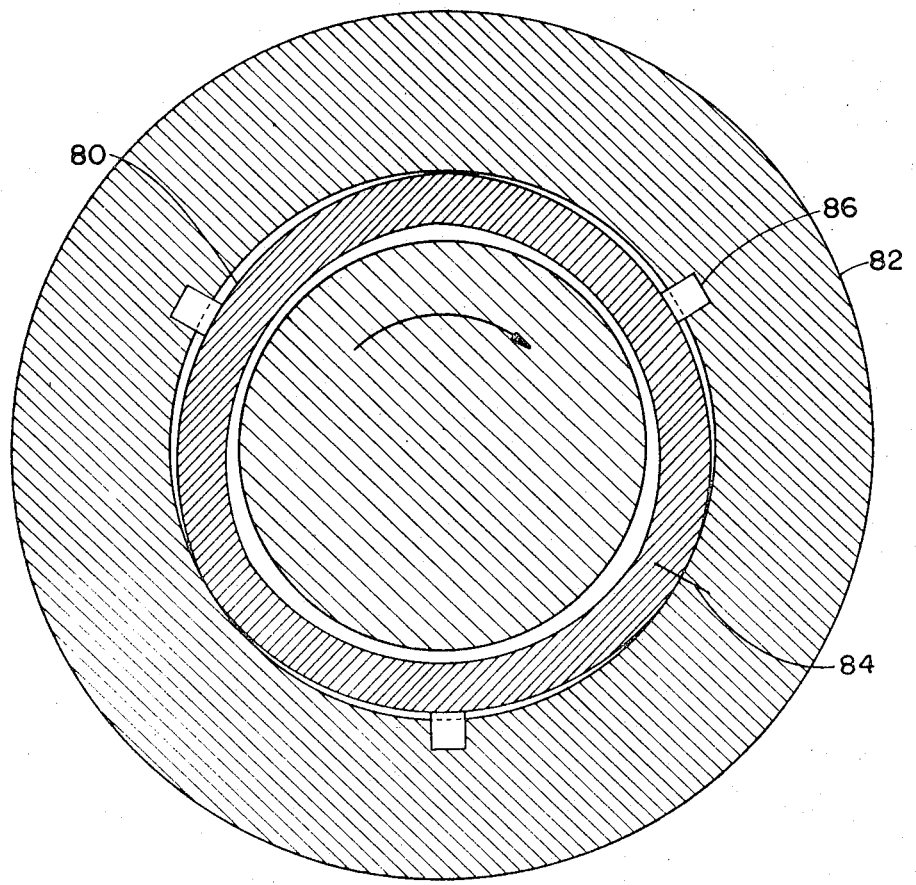
FIG. 8 is a cross section view of still another embodiment of a bearing.

In the embodiment shown in FIG. 8 no internal offset machining is required. In this embodiment a cylinder 80 of a bearing material is assembled into a bearing housing 82 without shimming by subcooling the cylinder, or heating the housing. The cylinder 80 is machined in place to a predetermined inside diameter. An identification mark 84 is imprinted on one surface of the cylinder 80 and the housing 82.

The cylinder 80 is removed from the housing 82 by subcooling or heating the assembly. Suitable shims 86 are placed around the inside diameter of the housing 82 in an equally spaced manner. These shims are secured to the top of the housing 82 by tack welding or taping to prevent dislocation during assembly. The thickness of each shim 86 is dependent in part upon the lobe height desired.

The cylinder 80 is again assembled in the shimmed housing 82 by subcooling the cylinder or heating the housing 82. During the assembly the identification mark 84 is aligned. When the cylinder 80 and the housing 82 have reached equilibrium conditions of temperature, an inside diameter trace can be made of the resultant contour. This will identify accurately the size of the lobing which has been obtained. The amount of lobing will depend on the thickness of the shims 86 as well as the physical properties of the bearing housing 82, the shims 86, and the bearing material 80.

While various embodiments of the invention have been shown and described it will be appreciated that other structural modifications may be made without departing from the spirit of the invention or the scope of the subjoined claims.

What is claimed is:

1. In combination with a lightly loaded shaft rotating at high speed having a film of lubricants thereon, an improved bearing comprising
    a stationary housing having a bore extending therethrough from oppositely disposed ends thereof for receiving said shaft, said bore having a substantially cylindrical surface,
    a cylinder of substantially rigid bearing material inserted in said bore, said cylinder having an inside diameter concentric with said bore and an outside diameter substantially equal to the diameter of said bore prior to the insertion of said cylinder into said bore, and
    a plurality of spaced shims in said bore between said cylinder and said housing, said shims being rigidly secured to said oppositely disposed ends of said housing to prevent movement thereof as said cylinder is inserted in said bore by subcooling the cylinder or heating the housing, said shims serving to deform said cylinder by maintaining selected portions of the outer surface of said cylinder out of engagement with said bore while other portions of said outer surface of said cylinder engage said bore thereby forming lobes for shaping the geometry of said film.

* * * * *